March 17, 1931.  I. L. DAWSON ET AL  1,797,051
CONVEYING MECHANISM FOR SHOCKING MACHINES
Filed June 12, 1929  2 Sheets-Sheet 1
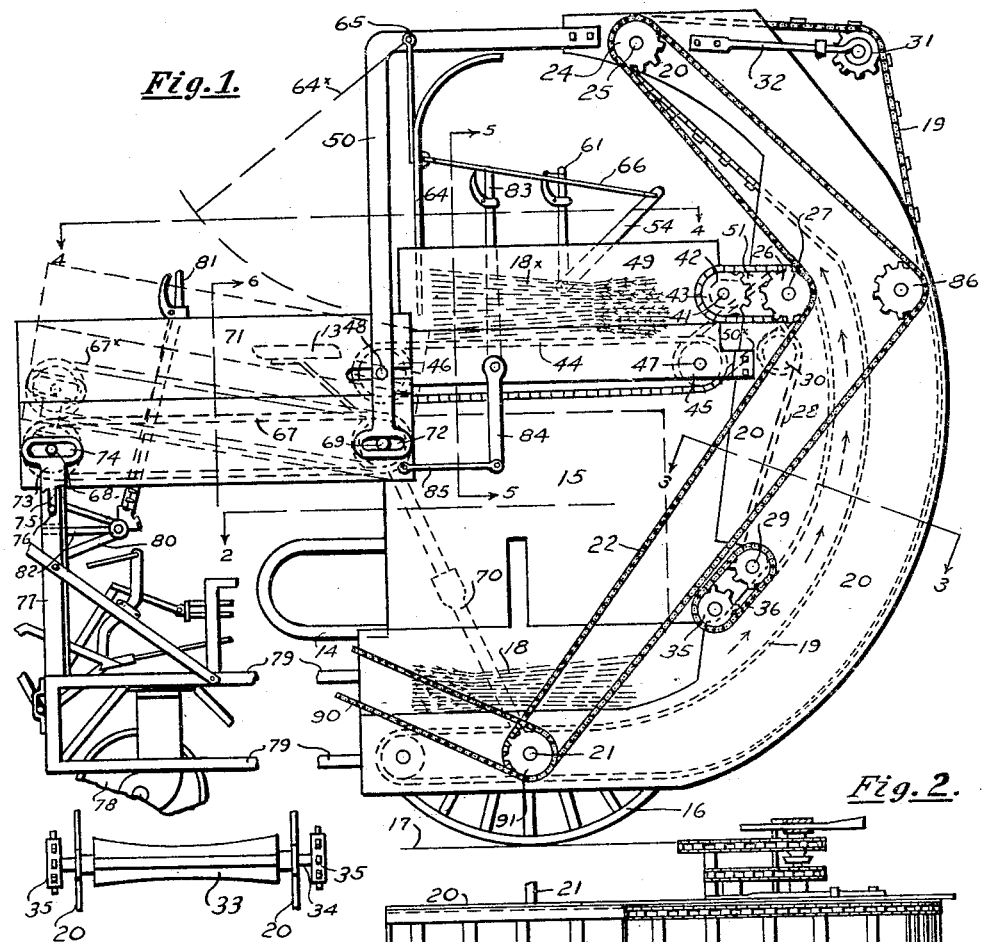
Fig.1.
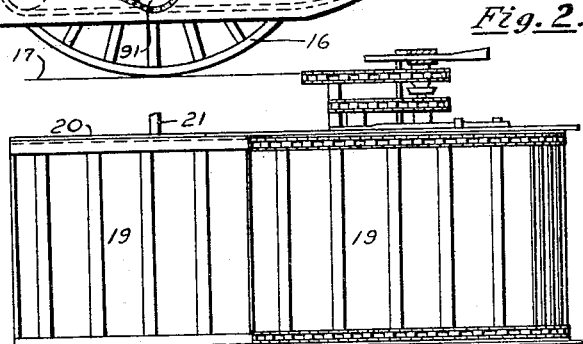
Fig.2.
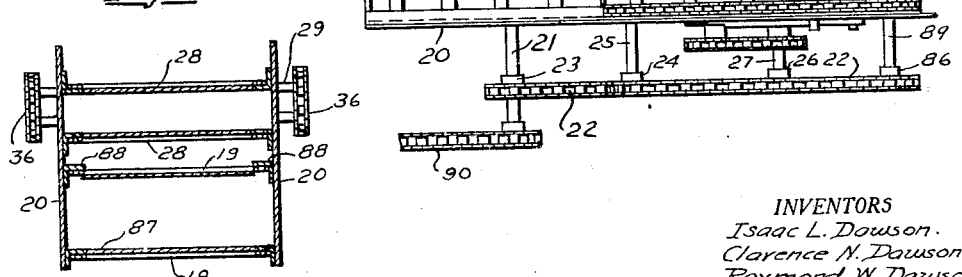
Fig.7.
Fig.3.
INVENTORS
Isaac L. Dawson.
Clarence N. Dawson.
Raymond W. Dawson.
BY William C. Edwards Jr.
ATTORNEY

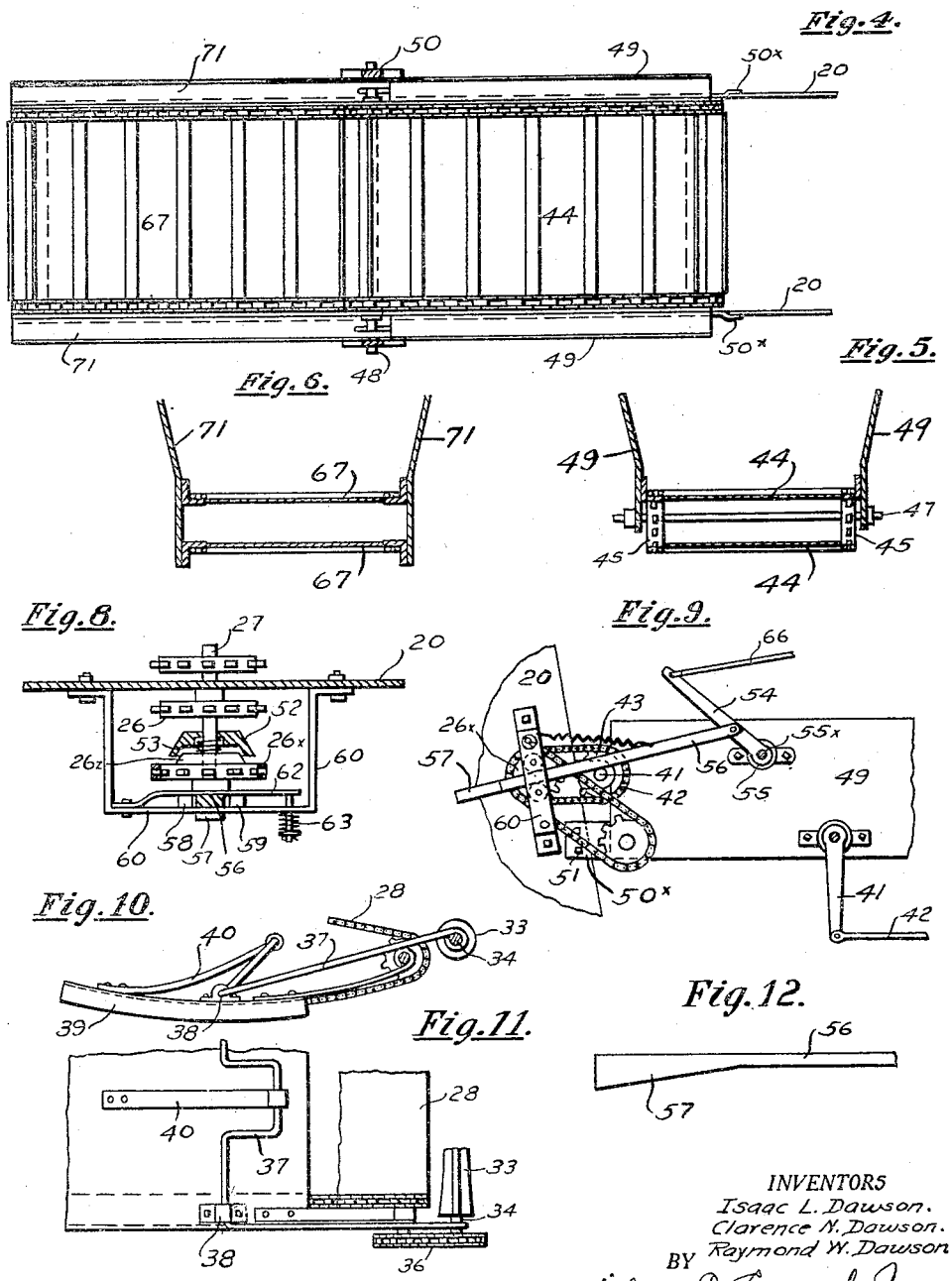

Patented Mar. 17, 1931

1,797,051

UNITED STATES PATENT OFFICE.

ISAAC L. DAWSON, CLARENCE N. DAWSON, AND RAYMOND W. DAWSON, OF LAWRENCE, KANSAS

CONVEYING MECHANISM FOR SHOCKING MACHINES

Application filed June 12, 1929. Serial No. 370,355.

The invention relates to a mechanism especially useful in combination with grain harvesters such as binders and the like for receiving bundled straw or loose straw and the like from such harvesting means, then for conveying the said harvested elements to a shock forming device and during such conveyance to first reverse the position of the harvested elements and to deposit it with force in a preferred manner within the shock forming means or so that the shock can be set mechanically in a compacted and well set up manner upon the ground.

The invention is similar in purpose to methods previously identified in combination with the shock forming means as developed by us and as identified in U. S. Patent 1,699,-584, shocking machine. The shock forming device therein illustrated will be considered as being employed in connection with the present device, though it is not illustrated herein. The present invention eliminates the gravity delivery of the harvested elements from the conveyor to the shock former and which occasioned undue height to our prior mechanism. By means of the associated elements herein described, we are able to substitute a positive delivery of the harvested bundles or loose straw to the shock forming means, for the gravity delivery previously described and claimed. By means of the present invention, we are able to more thoroughly compact the harvested elements within the shock former than was the case in the prior art.

In the drawings: Fig. 1 shows a side view of our improved conveying mechanism as disposed at the side of a grain binder and for delivery of harvested elements in a properly reversed position, with force, to a shock former such as was described and claimed in our prior invention above cited. Fig. 2 represents a top view of the main conveyor seen at the right of Fig. 1 and from the line 2 looking in the direction of the arrow. Fig. 3 shows a sectional view taken along the line 3—3 in Fig. 1 and looking in the direction of the arrows, Fig. 1. Fig. 4 represents a top view of the final conveying elements as viewed from the line 4—4, Fig. 1 looking in the direction of the arrows. Fig. 5 shows a sectional view taken along the line 5—5, Fig. 1 looking in the direction of the arrows, with parts removed for convenience of illustration. Fig. 6 is a sectional view taken along the line 6, Fig. 1. Fig. 7 is a detail view of our spring actuated roller seen in Fig. 1. Fig. 8 shows a sectional detail of the clutch control means employed in connection with the device seen in Fig. 5. Fig. 9 is a side view of the device seen in Fig. 8 and the associated elements on the reverse side of Fig. 1. Fig. 10 is a detail of the roller seen in Fig. 7 and its spring control. Fig. 11 shows a top view of Fig. 10. Fig. 12 shows a side view of the bar disclosed in Figs. 8 and 9 for effecting clutch disengagement. Similar numerals of reference indicate corresponding parts throughout all the figures of the drawings.

Referring to the drawings: at 13 is indicated the driver's seat of the binder; at 14 is a part of the frame of the binder; at 15 is seen the deck of the binder, with packers etc., removed for convenience of illustration. At 16 is the main supporting wheel of the binder, traveling upon the ground line 17. The bundle 18 of harvested elements, which may be bound or loose as the case may be since by our improved manner of shocking tied bundles need not be used unless so desired, has been dropped from the binder deck 15 upon the primary conveyor 19 for conveyance and for reversing the harvested elements end for end for purposes later explained. The primary conveyor preferably comprises a canvas slatted draper 19 arranged to travel between the side wall elements 20, 20 of the U-shaped frame seen in Fig. 1. This frame is carried at the side of the binder upon frame supporting means associated with said binder or so as to give a desired clearance above the ground line 17 as seen in Fig. 1. The shaft 21 is driven by means associated with the bull wheel on the binder and is the main drive shaft for our present device.

At 22 is the drive chain driven off sprocket 23 on shaft 21. This chain drives the sprocket 24 on the upper shaft 25 which has sprockets not shown for driving the chains carrying the draper 19. The shaft 25 is suitably mounted in bearings on the frame members 20—20. The chain 22 leads around the sprocket 26 on the shaft 27 and idler 86 to drive the upper draper 28 which runs around sprockets on the shaft 27 and the lower shaft 29 and around the idlers 30. At 31 is seen one of a pair of idler sprockets for the chain elements of the draper 19. These sprockets 31 are each carried by a spring bar supporting element such as 32 carried from the sides of the frame 20 as seen. The floor 87 and angles 88 guide the conveyor 19. The idler 86 rotates on the shaft 89.

The bundle 18 dropped upon the conveyor 19 will be immediately traveled in the direction of the arrows and between the upper draper 28 and said conveyor 19, the spacing between said drapers accommodating to the thickness of the bundles by action of the spring tighteners 32 upon the draper 19. In order to make the loose straw or bundles 18 feed into the passage between the drapers 28 and 19 we preferably employ the paddle roller seen in Figs. 7, 10 and 11. This roller 33 mounted upon the shaft 34, driven by the paired sprockets 35 by chain means such as 36 off of sprockets on the shaft 29, is carried by bearings at the end of spring actuated hangers 37 mounted as at 38 upon frame supports 39, the spring 40 yielding against incoming bundles to properly promote feeding operations.

After the bundle has passed above the roller on shaft 27, and since the shaft 25 is rearwardly positioned therefrom, the bundle 18 is free to reverse its prior position as first introduced upon the draper 19 and now will fall rearwardly with the grain facing in the direction of the travel of the composite machine or binder. This is necessary in order that the butt ends of the straw may be later deposited against the abutting board of the shock former and as identified with our prior patent previously cited. In order to accommodate for the functional movements of the shock former, it is desired to control the delivery of the harvested elements from the drapers 28—19 as will be now explained. Immediately behind the shaft 27 is a second shaft 41 carrying a roller upon which the reversed bundles fall after dropping from the draper 19. This roller actuated by the paired chain and sprocket assemblages (42 and 43) as driven by sprockets such as 26 causes the bundle to travel rearwardly or towards the shock forming means—not shown—but substantially formed and operable as in our prior patent cited. The bundle 18 now drops at 18$x$ upon the intermediate draper 44 which is carried and driven by sprockets 45 and 46 on the shafts 47 and 48 mounted in bearings associated with the side wall elements 49 supported by the frame means 20 and frame hangers 50 and 50$x$. Now this draper 44 does not travel all the time as does the draper 19 and its associated draper 28. A chain such as 51 driven from sprocket 26$x$ transmits power for such draper travel under control of the operator of the device. Upon the outer end of the shaft 27 is the clutch element 52 keyed to said shaft, with spring 53 normally holding the clutch face 26$z$ of the sprocket 26$x$ from clutch engagement. A crank 54 hinged at 55 upon the wall 49 carries a bar 56 enlarged at 57 as a wedge face which passes between rollers 58, 59 and behind the bracket 60 attached to the frame 20. The hand lever 61 leading through shaft 55$x$ operates the crank 54, but it is obvious that foot pedal means may be used in lieu of the hand lever 61 is so desired. Movement of the lever 61 is used to engage the face 57 against the part 60 to press the bar 62, spring controlled at 63 and whereby at the option of the driver of the binder the clutch assembly 26$z$ and 52 may be engaged or disengaged so as to drive or not drive the conveyor 44. Now as the bundle 18$x$ and succeeding bundles are driven off the roller shaft 41 it is desired that they pile up one upon the other between the side walls 49 and 49 and with their butts in vertical alignment and to effect this we introduce the stop board 64 pivotally depending from the frame elements 50 as at 65 and tied as at 66 by means of a bar to the crank 54, or so that when the clutch 52 is stopped by movement of the lever 61, the abutting board will be dropped from the outward hinged position 64$x$ to the position 64 to align the butts of the incoming dropped bundles. This control of the bundles 18$x$ gives then a time interval in which previously ejected bundles may travel off the outer conveyor 67 to the shock former, not shown.

This conveyor 67 is also a draper traveling around rollers on the shafts 68 and 69. The shaft 69 is driven by the gear driven shaft 70 associated with bevel gear means on shaft 21 and also on shaft 69 and hence is always in movement ready at all times to take bundles 18$x$ when the clutch 52 is engaged and the board 64 is outwardly swung to the position 64$x$. It will now be observed that we first provide a receptacle 19 as a conveyor for receiving the harvested elements with their grain heads rearwardly disposed, that we permit the forward and upward travel of these harvested elements to a position such that their prior position will be reversed with the butts of the harvested elements towards the rear, that is towards the shock former of our prior cited patent. Thence we allow for an accumulation of these bundles or loose elements as at 18$x$ with the grain heads towards the front; and later at selected time intervals we engage the clutch 52 and cause the harvested elements to travel rearwardly at considerable speed off of the conveyor 44 and upon the conveyor 67 and thence to be cast with force into the shock former of our prior patent. This is preferable to the gravity dumpage therein shown. In order to vary the delivery of the bundles 18x off of the conveyor 67 to best eject the same into the shock former we permit of forward and rearward adjustable movements of the shafts 68 and 69 and their associated frame 71 supporting means by slotting the lower extremities of the members 50 as at 72 and the upper extremities of the frame supporting means 73 as at 74. The element 73 carries a pin 76 which is located for vertical movements in a slot 75 on the standard 77. At 78 is seen a caster wheel supporting the rear frame construction 79 the front part of which is rigid to the tubular housing, not shown, and associated with the drive shaft 21, being the carrying support for the frame 20 in a manner similar to that disclosed in our prior patent cited. The standard 77 is carried from the frame 79. Upon the frame 79 it will be understood that winding drum mechanisms and allied elements will be placed to function with the shock forming means shown in our prior patent and which would be arranged directly in the rear of the shaft 68 or so as to receive the bundles as driven off the conveyor 67 with force into such shock forming means and the abutting board associated therewith. Brackets 80 rigid to a standard 77 support the hand lever 81 easily within reach of the driver on seat 13, the lever 81 is rigid to the crank 82 which bears beneath the foot of the member 73 or so that the pin 76 located within the slot 75 on the standard 77 will control movements up or down of the member 73 as actuated by the crank 82. Thus the driver through lever 83 actuating the crank 84 and link 85 may shift the conveyor 67 forward or back within the slotted limits 72 and 74 and at the same time elevate or depress the shaft 68 or so that the bundles as ejected off the conveyor 67 for delivery to the shock forming means and the abutting board as described in our prior patent, will more properly seat themselves within such device and with the force necessary to square their butts against said abutting board for the best interests of that device. The dotted position 67x shows the maximum raised position of the conveyor elements as controlled by the lever 81. The chain 90 driven by sprocket 91 is provided to operate the winding drum and the associated elements on the shock forming mechanism as disclosed in our prior patent cited. The spring 92, Fig. 9, normally acts to hold the face 57 of the bar 56 from contact with the member 60 thus preventing the clutch 26z—52 from engagement except when operated through the lever 61.

Such modifications may be employed as lie within the scope of the appended claims.

Having fully disclosed our invention, what we now claim as new and desire to secure by Letters Patent is:

1. Conveying mechanism for shocking machines as an attachment for grain binders including power means actuated from power driven elements on the binder; frame supporting means for said mechanisms including a U-shaped frame element; a conveying element comprising a chain driven draper assembly arranged upon sprocket and shaft means on said U-shaped frame element and adapted to receive harvested grain elements from the deck of the binder and to transport, elevate and reverse the position of said harvested grain elements; an upper draper on power actuated sprockets and shafting associated with and contiguous the first raddle, said draper being considerably shorter in length than the first raddle and with the upper part of the first raddle overhanging said draper.

2. In a device as described in claim 1, roller elements above and rearwardly from the upper draper; an intermediate conveying mechanism in a frame element rearwardly disposed from and below said roller and means for selectively engaging and disengaging said intermediate conveying mechanism from power movements; a stop board suspended above and at the rear of the intermediate conveyor and swung movements thereof associated with means for driving and stopping said intermediate conveyor; and a third conveying means in a frame element at the rear of and below the intermediate element and for receiving harvested elements therefrom and for outer ejection thereof from the third conveyor; and means carried by the frame elements associated with said device and for permitting forward and rearward adjustable movements of said third conveyor frame elements and for also permitting raised and lowered pivoted movements to the outer end thereof.

3. In a device as described in claim 1, a roller element forward of the upper draper and frame means spring actuated controlling its relationship to the first conveyor.

4. In a device as described in claim 1, and idler sprockets on spring supporting means at the upper part of said U-frame for adjustably arranging the tension upon said first conveyor.

In testimony whereof we affix our signatures.

ISAAC L. DAWSON.
CLARENCE N. DAWSON.
RAYMOND W. DAWSON.